United States Patent [19]
Ottassi

[11] 3,744,156
[45] July 10, 1973

[54] METHODS OF TEACHING BY TELEPHONE INCLUDING USING A LANGUAGE LABORATORY

[76] Inventor: Bachir Lahlou Ottassi, 26 E. 91st St., Apt. 3D, New York, N.Y. 10028

[22] Filed: June 14, 1971

[21] Appl. No.: 153,016

[52] U.S. Cl. ............................................. 35/35 C
[51] Int. Cl. ........................................... G09b 5/04
[58] Field of Search ........................... 35/8 A, 35 C

[56] References Cited
UNITED STATES PATENTS

| 3,199,226 | 8/1965 | Joslow | 35/35 C |
| 3,609,227 | 9/1971 | Kuljian | 35/35 C |
| 2,524,143 | 10/1950 | Smith | 35/8 A |
| 2,548,011 | 4/1951 | Frost | 35/8 A |

Primary Examiner—Wm. H. Grieb
Attorney—Jacob I. Kollin

[57] ABSTRACT

A method of teaching which involves communicating a pupils' exercise by telephone tape recorder to a teacher, recording the pupil's exercises along with the teacher's corrections, and returning the teacher's recording to the pupil.

4 Claims, 1 Drawing Figure

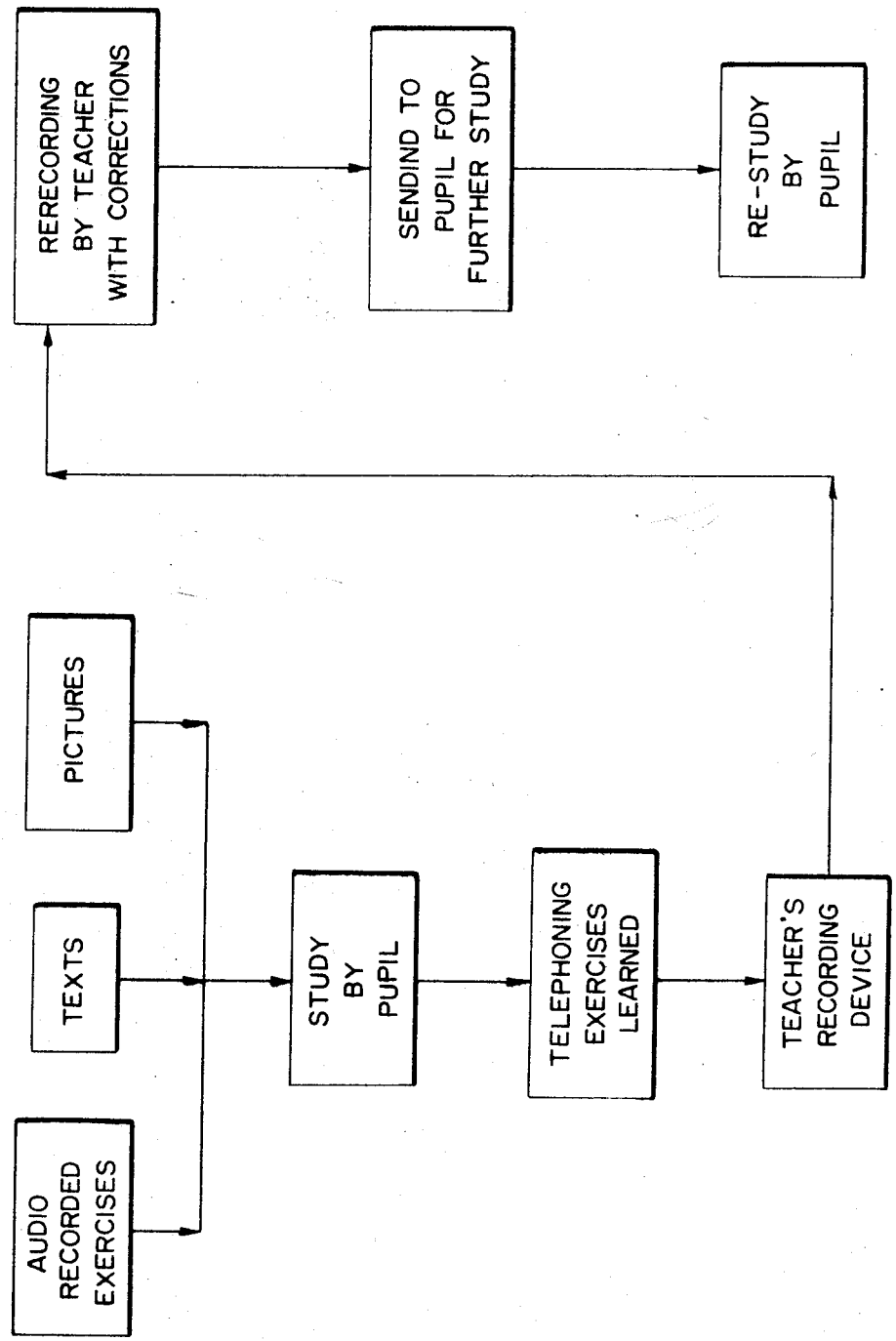

METHODS OF TEACHING BY TELEPHONE INCLUDING USING A LANGUAGE LABORATORY

GENERAL INTRODUCTION

Why have traditional methods of language teaching failed? Why have many students spent years studying such and such a language, without being able to express themselves correctly in this language? The reason is that traditional methods have forgotten that language is above all a means of communication, and that in order to learn a language, the first thing is to learn to speak. The written language occupies a place that is secondary with respect to the spoken language, but the most frequent error committed in the traditional teaching of a second language was to teach on the basis of the written language in order to "Teach the student to speak"! Do we not first learn to speak and then to write?

This is why modern linguistics gives priority to the spoken form, and provides us with new and much more effective means. We will therefore ask the pupil to write only after knowing that he can speak.

Teaching machines, when properly used, are very effective means for teaching languages. Professor Theodore Mueller of the University of Akron writes:

"Machines have been used to change the behavior of animals. Pigeons have learned to play ping-pong and rats have been taught to push buttons or make use of bars. In these experiments, these animals learned to behave in a manner very different from their habitual conduct. They acquired this manner of acting by a conditioning called "OPERATIVE CONDITIONING." The acquisition of a new method of behavior, could be one definition of the expression "learning a foreign language."

The student must acquire the patterns of the foreign language, and be able to make use of them as conditioned reactions to certain stimuli. Speaking a language can therefore be considered as a form of behavior, acquiring different habits. If animals without intelligence can change their behavior by means of "OPERATIVE CONDITIONING," human beings even more so can acquire new habits by means of similar methods."

Therefore, by using machines, and yet giving primordial place to man and to human contact, I am adapting to the teaching function, the methods which I will set forth below. I have thought that teaching, as I conceive of it, could be available to everyone: To the handicapped student as well as to others, rich or poor. I believe that in our time, and in the world in which we live, there is no time to be lost. (Transportation, for example). We have need of a School at home, and I believe that the methods which I propose will meet these needs.

Accordingly, I have provided several methods of teaching by telephone, including the use of a language laboratory, which are described below. It is to be understood, however, that my invention is not limited to the examples described, or to the teaching of languages, but said methods may equally well be employed in teaching numerous other subjects, and that various changes and modifications may be made in the details thereof without departing from the spirit and scope of the invention.

COMBINATION OF DEVICES: TELEPHONE + ANSWERING SERVICE MACHINE OR TELEPHONE + ANY DEVICE FOR RECORDING AND (OR) TRANSMITTING SOUNDS OR WORDS. A. TEACHING ANY LANGUAGES BY TELEPHONE AND ANSWERING MACHINE (OR TELEPHONE + ANY DEVICE FOR RECORDING AND (OR) TRANSMITTING SOUNDS OR WORDS

This teaching of languages by audio-visual method can be based either on a dialogue or on language exercises called PATTERN DRILLS.

A-I Language teaching based on:

DIALOGUE a. Materials used
1. By the pupil
the pupil will have a picture book
   a tape
   the telephone
Tape (or disc - preferably tape). Each lesson is based on a dialogue between two or three persons speaking in the language which the pupil proposes to study; this dialogue is recorded on tape. On this tape are also recorded phonetic exercises, questions raised by the teacher which the pupil is to answer, and, if necessary, explanations. Each picture in the book is matched by a semantic unit which is the oral expression thereof.
Picture book (a picture belongs with each semantic unit on the tape) Each picture is matched by a "Text" in the mother tongue of the pupil in the language which he proposes to learn.

EXAMPLE:

for a pupil learning French, for example.
Voila M. X.
(Here is Mr. X.)
The telephone. We will see below how it is used in: "How the pupil is to proceed"
2. By the teacher
The teacher will have:
a telephone a telephone answering machine or any other device which can record and (or) transmit sound or words, and which can be connected to the telephone.
b. How the pupil is to proceed.
Assimilation of the lesson: the pupil will listen to the lesson several times, following the pictures with his eyes (picture book + tape); he will gradually familiarize himself with the pronunciation.

In a second stage he will try to understand the lesson without calling on the translation (he will look at the translation only if he encounters difficulty). The pictures must be suggestive and correspond to a single situation. The sound unit will aid enormously in comprehension by rhythm, intonation, etc.

In a third stage, hence after audition, repetition and comprehension, the pupil will try to recapture the dialogue himself, and to memorize it.

Exercises: the student will do all the exercises proposed by the teacher and recorded on the tape. For this he will use:
the telephone (because in a first stage the spoken language is given priority) and he will do all the exercises orally by telephone. Everything that he does by telephone (after dialing the number of his teacher) will be recorded on the answering service machine (or any other device recording and (or) emitting sounds or words and connected to the teacher's telephone).

c. How the teacher is to proceed.

Everything said by the pupil over the telephone was recorded on his answering service machine (or any other device recording and (or) emitting sounds or words) and connected to the telephone.

He will listen attentively to everything said by the pupil. The teacher can record what was said by the pupil, as is, on a magnetic tape, retaining the mistakes of all types (pronunciation, comprehension, etc.). He will send this tape to the pupil, with addition of his own comments and advice. The teacher can thus, if he sees fit, reproduce on a sheet of paper everything said by the pupil (reproducing faults of all types). He can underline the faults, explain the points of grammar or style (this will depend on the level of the pupil, if the pupil can read at this point.

He will then send to the latter:
1. The pupil's text and the standard correction plus comments (tape)
2. The pupil's text plus standard correction (on a sheet) A-II Language teaching based on:

PATTERN DRILLS

In order to learn the oral language and acquire grammar, the teacher will use Pattern Drills.

a. Materials used
1. By the pupil
the pupil will have: telephone
picture book
tape Telephone: we will see below how it is used in "How the pupil is to proceed."

Picture book: Each picture will be matched by a semantic unit which is the sonic expression thereof.

Each picture will be accompanied by a "text" in the mother tongue of the pupil, and in the language which he proposes to learn.

EXAMPLE:

Jacques donne un boite a Pierre
Jacques gives a box to Pierre

Tape or disc (preferably tape). On this tape are recorded the pattern drills which the pupil is to do. Each picture in the book is matched by a sound unit. The tape also contains the instructions to be followed + phonetics, etc.

2. By the teacher
The teacher will have:
telephone
answering service machine (or any other device recording and
(or) emitting sounds or words)

How the pupil is to process.
Assimilation of the lesson:
Example: look at the picture and listen to the matching sound (picture in the book, sound on tape) - use translation in case of difficulty -
repetition
memorization Jacques donne la boite a Philipps — translation. (Jacques gives Philippe the box)

In a second stage he will do the exercise proposed to him by the tape without the picture book. He will do this exercise by telephone (different types of pattern drills: repetition, substitution, transformation, expansion, etc.). Take the following example (pupil having learned the meaning of "Jacques donne la boite a Philippe" and having repeated it): the teacher can ask the pupil to substitute "la chaise" (the chair) for "la boite" (he will previously have given the instructions to follow in the pupil's language. The pupil, making use of the telephone will say:

"Jacques donne la chaise a Philipps" instead of
"Jacques donne la boite a Philippe."

His reply is immediately recorded on the answering service machine (or any other device recording and (or) transmitting sound or words, and which can be connected to the telephone) of the teacher.

The pupil will also have various exercises of phonetics, repetition, etc., on tape and for these also he will use the telephone.

c. How the teacher is to proceed.

The teacher will listen on his answering machine (or any other device recording and (or) transmitting sound or words and which can be connected to the telephone) to everything the pupil has said (answers to exercises, patterns, pronunciation, etc.). He will record everything the pupil has said with all faults committed, on a tape, he will add his own comments and the correct responses on a sheet. He can also add (this depending on the level of the pupil) the ansers of the pupil, faults underlined + the proper answers. He will send all this to the pupil.

Example of pattern drill: answer the questions according to the model

Model: Qu'est-ce que c'est? (chapeau) (What is this, a hat) "C'est un chapeau" (it is a hat)

1. - a. Qu'est-ce que c'est? (appartement) (apartment)
    b. Pupil - telephone
    c. Teacher, "C'est un appartement"
2. - Qu'est-ce que c'est? (camion) (truck)
    b. Pupil - telephone
    c. Teacher, "C'est un camion"

Having thus described my invention, what I claim and desire to protect by Letters Patent of the United States of America is:

1. The method of teaching at home providing a pupil with a series of audio-recorded exercises and a series of matching pictures and printed texts corresponding to the audio-recorded exercises, studying of the exercises by the pupil, communicating by the pupil of the exercises learned by the pupil to a teacher, recording of the pupil's, exercises by the teacher on a teacher's tape, re-recording by the teacher, on another tape, of the exercises and the teacher's corrections and sending the re-recorded tape to the pupil.

2. The method of claim 1 wherein the step of communicating involves telephoning.

3. The method of claim 1 wherein the step of communicating involves recording.

4. The method according to claim 1, further comprising providing the pupil by the teacher of a written record of said re-recorded exercises including the corrections by the teacher.

* * * * *